US009448933B2

(12) United States Patent
Gurumurthi et al.

(10) Patent No.: US 9,448,933 B2
(45) Date of Patent: Sep. 20, 2016

(54) USING REDUNDANT TRANSACTIONS TO VERIFY THE CORRECTNESS OF PROGRAM CODE EXECUTION

(71) Applicant: Advanced Micro Devices, Inc., Sunnyvale, CA (US)

(72) Inventors: Sudhanva Gurumurthi, Watertown, MA (US); Vilas Sridharan, Brookline, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 273 days.

(21) Appl. No.: 14/013,252

(22) Filed: Aug. 29, 2013

(65) Prior Publication Data

US 2015/0067278 A1 Mar. 5, 2015

(51) Int. Cl.
*G06F 11/14* (2006.01)
*G06F 12/08* (2016.01)

(52) U.S. Cl.
CPC ................. *G06F 12/0811* (2013.01)

(58) Field of Classification Search
CPC ............ G06F 12/1009; G06F 17/30575; G06F 9/30021; G06F 12/0811; G06F 11/14
See application file for complete search history.

(56) References Cited

U.S. PATENT DOCUMENTS

| 7,027,542 B1* | 4/2006 | Shihadeh | 375/354 |
| 2010/0250870 A1* | 9/2010 | Vick et al. | 711/154 |

OTHER PUBLICATIONS

G. Yalcin et al., "FaultTM: Fault-Tolerance Using Hardware Transactional Memory," Pespma 2010—Workshop on Parallel Execution of Sequential Programs on Multi-core Architecture (2010).

* cited by examiner

*Primary Examiner* — David X Yi
*Assistant Examiner* — Candice Rankin
(74) *Attorney, Agent, or Firm* — Park, Vaughan, Fleming & Dowler LLP (57) ABSTRACT

In the described embodiments, a processor core (e.g., a GPU core) receives a section of program code to be executed in a transaction from another entity in a computing device. The processor core sends the section of program code to one or more compute units in the processor core to be executed in a first transaction and concurrently executed in a second transaction, thereby creating a "redundant transaction pair." When the first transaction and the second transaction are completed, the processor core compares a read-set of the first transaction to a read-set of the second transaction and compares a write-set of the first transaction to a write-set of the second transaction. When the read-sets and the write-sets match and no transactional error condition has occurred, the processor core allows results from the first transaction to be committed to an architectural state of the computing device.

33 Claims, 3 Drawing Sheets

USING REDUNDANT TRANSACTIONS TO VERIFY THE CORRECTNESS OF PROGRAM CODE EXECUTION

GOVERNMENT RIGHTS

This invention was made with Government support under prime contract number DE-AC52-07NA27344, subcontract number B600716 awarded by DOE. The Government has certain rights in this invention.

BACKGROUND

1. Field

The described embodiments relate to computing devices. More specifically, the described embodiments relate to using redundant transactions to verify the correctness of program code execution in computing devices.

2. Related Art

Many modern computing devices include a graphics processing unit (GPU) with processing circuits that are optimized for performing operations related to graphics processing. In some of these computing devices, the GPU can also be configured to offload certain types of computational operations from other entities in the computing device. For example, in some computing devices, upon encountering certain types of single-instruction-multiple-data (SIMD) operations when executing program code, a central processing unit (CPU) forwards the SIMD operations to the GPU. The GPU performs the SIMD operations (in some cases, more efficiently than the CPU due to the configuration of the processing circuits in the GPU) and returns results from the SIMD operations to the CPU, where the results can be used in subsequent operations.

Despite having this capability, a small possibility of undetected faults in some GPUs means that, in certain situations, the GPUs are unable to be used to offload computational operations from other entities in the computing device. For example, in some GPUs, faults during computational operations that are caused by physical anomalies (e.g., bit-flips caused by environmental variances such as electromagnetic fields, electromagnetic particle impacts, circuit errors, etc.) may be undetected. Thus, the GPUs may not be used for offloading computational operations in computing devices where high performance and/or high reliability are necessary and/or in environments where such faults are more likely.

SUMMARY OF EMBODIMENT(S)

The described embodiments include a computing device with a processor core (e.g., a graphics processing unit (GPU) core, etc.) that includes multiple compute units. In these embodiments, the processor core receives a section of program code to be executed in a transaction from another entity in the computing device (e.g., from a central processing (CPU) unit in the computing device). The processor core then sends the section of program code to one or more compute units to be executed in a first transaction and in a second transaction. When the first transaction and the second transaction are completed, the processor core compares a read-set of the first transaction to a read-set of the second transaction and compares a write-set of the first transaction to a write-set of the second transaction. When the read-sets and write-sets match, the processor core allows results from the first transaction to be committed to an architectural state of the computing device (and discards the results from the second transaction). However, when the read-sets or the write-sets do not match, the processor core discards results from the first transaction and the second transaction and performs a remedial action.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., microcode, firmware, etc.) to perform the described operations.

TERMINOLOGY

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Entities: entities include a portion of the hardware in a computing device and/or software executing on a computing device that can perform the operations herein described. For example, entities can include, but are not limited to, one or more processors (e.g., CPUs, GPUs, APUs, etc.), one or more processor cores (e.g., CPU cores, GPU cores, etc.) and/or one or more threads executing on one or more CPU cores, APU cores, or GPU cores, a compute unit in a core or a thread executing thereon, or some combination thereof.

Architectural state: the architectural state of a processor, a computing device, etc. includes data and information held in the processor, computing device, etc. that may be used by entities in the processor, computing device, etc. (accessed, read, overwritten, modified, etc.). Generally, the data and information comprises any type(s) of data and information held in the processor, computing device, etc. that can be used by entities, such as data stored in memories and/or caches, data stored in registers, state information (flags, values, indicators, etc.), etc. When a result of an operation is "committed" to the architectural state, the result is made accessible to and thus usable by entities in the computing device.

Hardware transactional memory: in some embodiments, hardware transactional memory is implemented by enabling entities in a computing device to execute sections of program code in "transactions," during which program code is executed normally, but transactional operations/results are prevented from being made accessible to and usable by other entities on the computing device. For example, memory accesses (reads and writes) are allowed during transactions, but transactional memory writes may be prevented from being committed to one or more levels of a memory hierarchy in the computing device during the transaction, thereby rendering the transactionally-written data inaccessible by other entities in the computing device during the transaction. During transactions, memory accesses from other entities are monitored to determine if a memory access from another entity interferes with a transactional memory access (e.g., if another of the entities writes data to a memory location read during the transaction, etc.) and transactional operations are monitored to ensure that an error condition has not occurred. If an interfering memory access or an error condition is detected during the transaction, the transaction is aborted, a pre-transactional state of the entity is restored, and the entity may retry the transaction by re-executing the section of program code in another transaction and/or some error-handling routine may be performed. Otherwise, if the entity executes the section of program code without encountering an interfering memory access or an error condition, the entity commits the transaction, which includes committing transactional operations/results (memory writes, state changes, etc.) to an architectural state of the computing device—thereby making the results of the held transactional operations accessible to and usable by other entities on the computing device.

Overview

In the described embodiments, a processor core (e.g., a GPU core) in a computing device receives a section of program code (i.e., a portion of program code including one or more instructions) to be executed in a transaction from another entity in the computing device (e.g., from another entity in the computing device such as a CPU). The GPU core then creates a "redundant transaction pair" by causing one or more compute units in the GPU core to start separately executing the transaction. For example, a first compute unit can execute the section of program code in a first transaction and a second compute unit can execute the section of program code in a second transaction. As another example, one compute unit can execute both the first transaction and the second transaction (e.g., using two threads). When the one or more compute units have finished executing the corresponding transaction, the GPU core compares a read-set and a write-set for each transaction to a read-set and a write-set for the other transaction to ensure that the read-sets and write-sets for the transactions match. Generally, the read-set includes memory locations and data read during a transaction and the write-set includes memory locations and data written during the transaction. If the read-sets and the write-sets match, the GPU core commits one set of results (e.g., from the first transaction) and discards the other set of results (e.g., from the second transaction). However, if the read-sets and write-sets do not match, a fault, error, etc. is assumed to have occurred in at least one of the one or more compute units when executing the first transaction and the second transaction. In this case, the results from both transactions are discarded and a remedial action is performed (e.g., the redundant transaction pair is restarted, error-handling code is executed, and/or another action is performed).

By executing the redundant transaction pair and performing the above-described comparison/verification operation, transactions that have encountered a fault, error, etc. can be discovered and the potential for undetected faults in the GPU core is reduced in comparison to existing GPU cores. This reduction in undetected faults enables the use of the GPU core (and, more generally, the computing device) in situation in which higher-performance and higher-reliability are called for and in environments where such faults are more likely.

Computing Device

Figure 1:
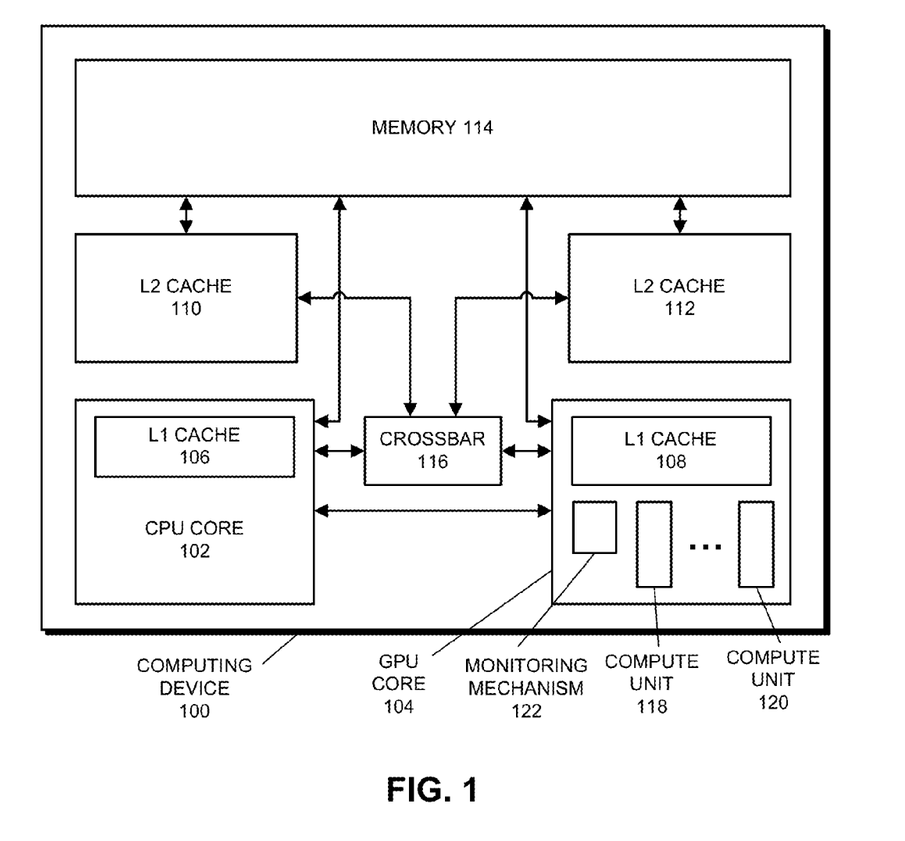
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes CPU core 102, GPU core 104, L2 caches 110 and 112, memory 114, and crossbar 116. CPU core 102 is a functional block such as a microprocessor core, an application-specific integrated circuit (ASIC), a microcontroller, a programmable logic device, and/or an embedded processor that is configured to perform general computational operations in computing device 100. GPU core 104 is a functional block such as a graphics processor core that is configured to efficiently perform operations related to graphics processing. In the described embodiments, GPU core 104 is a general-purpose GPU core, and thus is further configured to accept sections of program code from CPU core 102 for processing in GPU core 104. For example, GPU core 104 may accept program code from CPU core 102 that includes operations such as single-instruction-multiple-data (SIMD) and other types of operations that GPU core 104 is configured to perform (and may, in some cases, perform more efficiently than CPU core 102).

CPU core 102 and GPU core 104 include cache memories (or "caches") L1 cache 106 and L1 cache 108, respectively. L1 cache 106 and L1 cache 108 are used for storing instructions and data that are used by CPU core 102 and GPU core 104, respectively, for performing computational operations. Generally, L1 caches 106 and 108 are the smallest of a set of caches in computing device 100 and are located closest to processing circuits (e.g., compute/execution units, instruction fetch units, etc.) in the respective core. The closeness of the L1 caches 106 and 108 to the corresponding processing circuits enables the fastest access to the instructions and data stored in the L1 caches 106 and 108 from among the caches in computing device 100.

Level-two (L2) caches 110 and 112 are shared by CPU core 102 and GPU core 104 and are used for storing instructions and data for both of the sharing cores. A complete/whole L2 cache in computing device 100 is formed from the combination of L2 caches 110 and 112, with each of L2 caches 110 and 112 providing storage for a portion of the instructions and data that may be stored in the L2 cache in computing device 100. For example, in some embodiments, a first portion (e.g., half) of a set of cacheable addresses in computing device 100 may be stored in L2 cache 110 and a second portion of the set of cacheable addresses may be stored in L2 cache 112. In these embodiments, crossbar 116 is used to route traffic between L2 caches 110 and 112 and CPU core 102 and GPU core 104 (e.g., to route cache blocks to/from CPU core 102 or GPU core 104 from/to the appropriate one of L2 cache 110 or 112). Generally, the L2 cache (formed by the combination of L2 caches 110 and 112 as described) is larger than L1 caches 106 and 108 and is located outside, but close to, CPU core 102 and GPU core 104. Because the L2 cache is located outside the cores, access to the instructions and data stored in the L2 cache is slower than accesses to L1 caches 106 and 108.

Each of L1 caches 106 and 108 and L2 caches 110 and 112 (collectively, "the caches") include memory circuits that are used for storing data and instructions. For example, the caches can include one or more of static random access memory (SRAM), dynamic random access memory (DRAM), double data rate synchronous DRAM (DDR SDRAM), and/or other types of memory circuits.

Memory 114 comprises memory circuits that form a "main memory" in and for computing device 100. Memory 114 is used for storing instructions and data for use by CPU core 102 and GPU core 104. In some embodiments, memory 114 is larger than the caches in computing device 100 and is fabricated from memory circuits such as one or more of DRAM, SRAM, DDR SDRAM, and/or other types of memory circuits.

Taken together, L1 caches 106 and 108, the L2 cache formed by the combination of L2 caches 110-112, and memory 114 form a "memory hierarchy" in and for computing device 100. Each of the caches and memory 114 can be regarded as "levels" of the memory hierarchy, with the lower levels including the larger caches and memory 114. Thus, the highest level in the memory hierarchy includes L1 caches 106 and 108.

As can be seen in FIG. 1, GPU core 104 includes compute unit 118, compute unit 120, and monitoring mechanism 122. Compute units 118 and 120 are generally functional blocks that are configured to perform computational operations in GPU core 104. For example, in some embodiments, each compute unit includes processing circuits such as arithmetic logic units, pipelines, general-purpose processing circuits, etc. that are configured to perform the computational operations. In some embodiments, compute units 118 and 120 are configured to perform operations for graphics processing. In some embodiments, compute units 118 and 120 are further configured so that sections of program code passed to GPU core 104 from other entities in computing device 100 can be executed. In addition, in some embodiments, compute units 118 and 120 (and, more generally, GPU core 104) include hardware transactional memory mechanisms that enable the execution of sections of program code in one or more concurrent transactions (hardware transactional memory is described above).

Monitoring mechanism 122 is a functional block that includes circuits that perform operations for handling the herein-described redundant transaction pairs. For example, in some embodiments, monitoring mechanism 122 causes compute unit 118 to start a first transaction for a section of program code received from another entity in computing device 100 and causes compute unit 120 to start a second transaction for the section of program code. As another example, in some embodiments, monitoring mechanism 122 causes a single compute unit 118 (or compute unit 120) to start both a first transaction for a section of program code received from another entity in computing device 100 and a second transaction for the section of program code (e.g., using two or more threads on compute unit 118, etc.). As another example, in some embodiments, monitoring mechanism 122 records which of the transactions should be committed (e.g., the first transaction) and which should be discarded (e.g., the second transaction) if/when the transactional read-sets and write-sets match. As yet another example, in some embodiments, monitoring mechanism 122 records the read-set and the write-set for each of the first and second transactions. As yet another example, in some embodiments, when the first and second transactions complete, monitoring mechanism 122 performs the comparison operation to compare the read-sets and the write-sets for the first and second transactions. As yet a further example, in some embodiments, monitoring mechanism 122 either commits a transaction (and discards the results for the other transaction) when the read-sets and the write-sets for the transactions match, or discards the results for both transactions when the read-set or the write-set do not match and causes GPU core 104 to perform a remedial operation. More generally, monitoring mechanism 122 performs some or all of the operations for handling redundant transaction pairs described herein.

Figure 2:
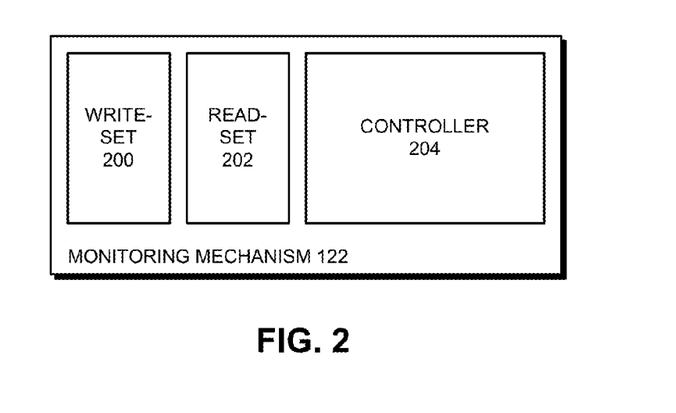
FIG. 2 presents a block diagram illustrating a monitoring mechanism in accordance with some embodiments.

FIG. 2 presents a block diagram illustrating monitoring mechanism 122 in accordance with some embodiments. As can be seen in FIG. 2, monitoring mechanism 122 includes write-set 200, read-set 202, and controller 204. Generally, monitoring mechanism 122 maintains data relating to the progress and results related to the execution of the first and second transactions. The specific data maintained about the progress and results of the first and second transactions can vary. In certain embodiments described herein monitoring mechanism 122 maintains data related to the write and read accesses made during a particular transaction. As will be appreciated by those of ordinary skill, varying amounts and different types of data than that described herein could be maintained by monitoring mechanism 122. Referring to FIG. 2, write-set 200 includes circuits (e.g., memory circuits, logic circuits, etc.) for storing/keeping records of write-sets for compute units in GPU core 104 (e.g., for compute unit 118, etc.) as the compute units execute corresponding transactions. For example, each time data is written to a memory location during a transaction, monitoring mechanism 122 can add a corresponding record to a write-set for the transaction for the compute unit in write-set 200. Each record generally includes information useful for identifying and comparing a corresponding transactional write as write-sets are subsequently compared. For example, in some embodiments, records may include an identifier for a memory location where data was written during the transaction (e.g., some or all of an address for the memory location) and/or the data that was written to the memory location.

Read-set 202 includes circuits (e.g., memory circuits, logic circuits, etc.) for storing/keeping records of read-sets for compute units in GPU core 104 (e.g., for compute unit 118, etc.) as the compute units execute corresponding transactions. For example, each time data is read from a memory location during a transaction for a given compute unit, monitoring mechanism 122 may add a corresponding record to a read-set for the transaction for the compute unit in read-set 202. Each record generally includes information useful for identifying and comparing a corresponding transactional read as read-sets are subsequently compared. For example, in some embodiments, records may include an identifier for a memory location from which data was read during the transaction (e.g., some or all of an address for the memory location) and/or the data that was read from the memory location.

Controller 204 is a functional block that includes circuits for performing the above-described operations for handling redundant transaction pairs. For example, in some embodiments, controller 204 may cause compute unit 118 to start a first transaction for a section of program code and cause compute unit 120 to start a second transaction for the section of program code, may add records to read-set 202 and write-set 200 to assemble a read-set and a write-set for each of the first and second transactions, etc. In some embodiments, the circuits in controller 204 are configured to perform the operations (in hardware). In other embodiments, the circuits in controller 204 are general-purpose computing circuits configured to execute program code (firmware, microcode, etc.) that causes the circuits to perform the operations.

Figure 3:
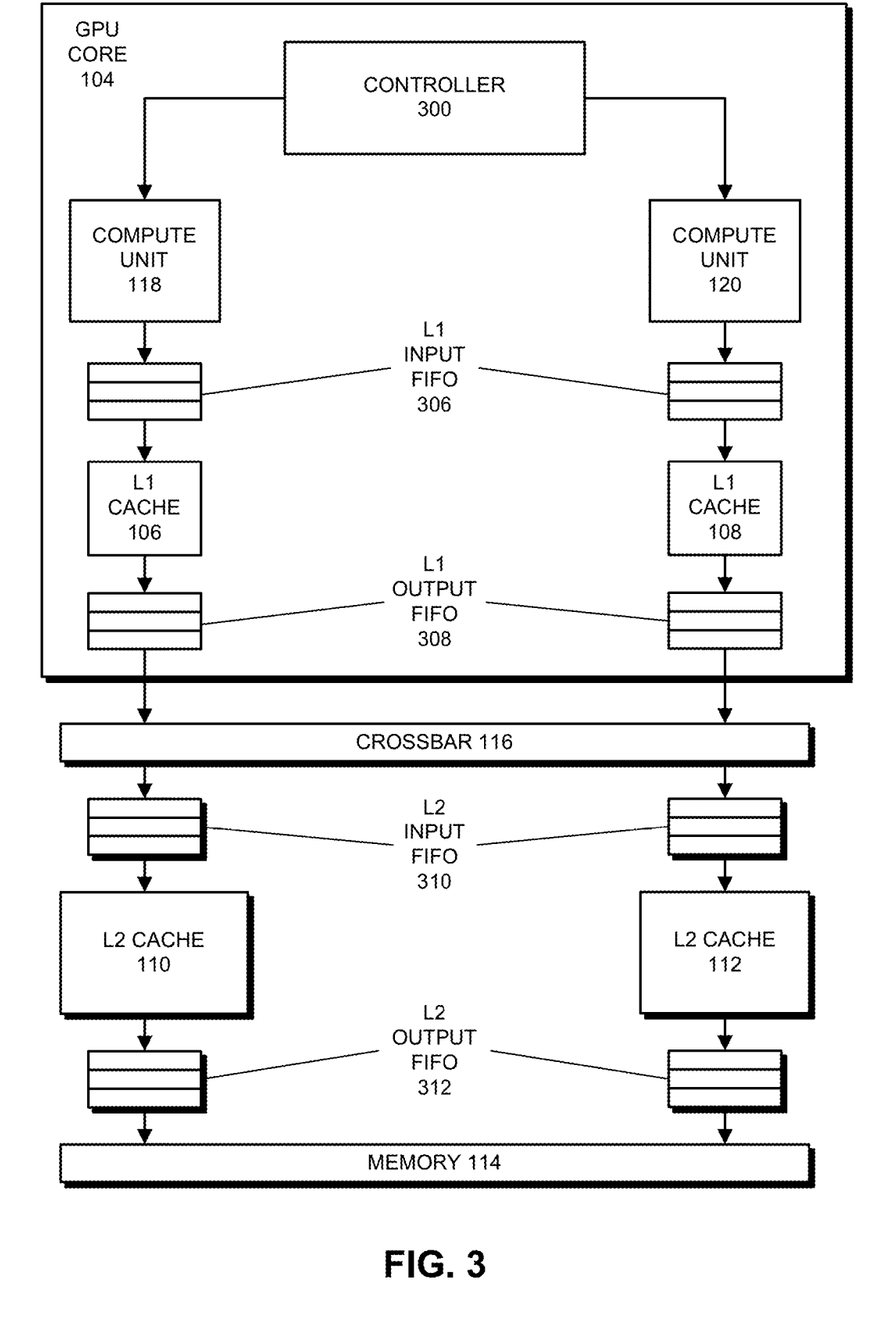
FIG. 3 presents a block diagram illustrating a GPU core and a memory hierarchy in accordance with some embodiments.

Although monitoring mechanism 122 is used in describing embodiments, in some embodiments, some or all of the operations described as being performed by monitoring mechanism 122 are performed by different functional block(s) in computing device 100. For example, in some embodiments, functional blocks for implementing hardware transactional memory (e.g., read-set and write-set recording mechanisms, monitoring mechanisms, and/or other mechanisms) in GPU core 104 or elsewhere in computing device 100 (not shown) can perform some or all of the operations. As another example, in some embodiments, monitoring mechanism 122 can access information from various FIFOs in computing device 100, as shown in FIG. 3, and thus may not keep some or all of write-set 200 and read-set 202. Generally, computing device 100 includes sufficient functional blocks to perform operations for handling redundant transaction pairs.

Although an embodiment is described with a particular arrangement of cores (i.e., CPU core 102 and GPU core 104), some embodiments include a different number and/or arrangement of cores. For example, some embodiments have two, five, eight, or another number of CPU and/or GPU cores—with the memory hierarchy adjusted accordingly. Generally, the described embodiments can use any arrangement of cores that can perform the operations herein described.

Additionally, although an embodiment is described with a particular arrangement of caches, some embodiments include a different number and/or arrangement of caches. For example, the caches (e.g., L1 caches 106 and 108, etc.) can be divided into separate instruction and data caches. Additionally, the L2 cache formed from the combination of L2 caches 110 and 112 may not be shared in the same way as shown and/or may not be split in two portions (and thus crossbar 116 may not be present). As another example, some embodiments include different levels of caches, from only one level of cache to multiple levels of caches, and these caches can be located in CPU core 102 and GPU core 104 and/or external to the cores. For instance, some embodiments include one or more L3 caches (not shown) in the cores or outside the cores that is used for storing data and instructions for the cores. Generally, the described embodiments can use any arrangement of caches that can perform the operations herein described.

Moreover, as shown in FIG. 1, computing device 100, CPU core 102, and GPU core 104 are simplified for illustrative purposes. In some embodiments, computing device 100, CPU core 102, and/or GPU core 104 include additional mechanisms for performing the operations herein described and other operations. For example, computing device 100, CPU core 102, and GPU core 104 can include power systems (batteries, plug-in power sources, etc.), mass-storage devices such as disk drives or large semiconductor memories (as part of the memory hierarchy), media processors, input-output mechanisms, communication mechanisms, networking mechanisms, display mechanisms, etc.

A Representative Value for Read-Set and/or Write-Set

In some embodiments, GPU core 104 (e.g., controller 204) includes circuits for computing one or more values that are used as a representation for read-sets and/or write-sets for transactions. For example, in some embodiments, controller 204 can compute a single cumulative hash value of a predetermined length (e.g., one or more bytes) that represents a given read-set or write-set. More specifically, controller 204 may acquire information (e.g., an identifier for a memory location and/or the data read from/written to the memory location) about each transactional read or write and may input the acquired information into a hash function to compute the single cumulative hash value. In these embodiments, any hash function that maps or converts information about transactional reads or writes to the hash value of the predetermined length can be used. For example, in some embodiments, one or more bitwise XORs of the bits from the information about transactional reads or writes can be used in generating the corresponding hash value. As another example, a checksum function, a lookup table, and/or a specialized/dedicated hash function may be used as the hash function.

In some embodiments, when performing the comparison operation, controller 204 use the representations of the read-set and/or the write-set to perform the comparison. More specifically, and using read-sets as an example, during first and second transactions (as described above), controller 204 use information about transactional reads to generate representations for read-sets for the first and second transactions. When subsequently comparing the read-sets, controller 204 retrieves each of the representations and compares the retrieved representations to each other to determine if the representations match, and thus if the read-sets match. For example, controller 204 can perform a logical comparison, a bitwise comparison, etc. When the representations match, controller 204 determine that the read-sets match. Write-sets may be handled in a similar way.

In some embodiments, the read-set or the write-set for each transaction includes a combination of both the above-described single cumulative value and a complete record for the transaction. For example, a read-set or write-set may include a single cumulative value computed using the data from each read or written memory location, but may also include a complete list of identifiers for memory locations read or written during the transaction. As another example, a read-set or write-set may include a single cumulative value computed using identifiers for each read or written memory location, but may also include a complete list of data read from or written to memory locations during the transaction. In these embodiments, when comparing the read-set or the write-set of the transaction, the single cumulative values and/or the complete records may be compared.

Monitoring Transactional Results in the Memory Hierarchy

FIG. 3 presents a block diagram illustrating GPU core 104 and a memory hierarchy in accordance with some embodiments. As shown in FIG. 3, GPU core 104 includes controller 300, which is coupled to compute units 118 and 120. Controller 300 is a functional block that is configured to receive sections of program code that are to be executed in GPU core 104 from other entities in computing device 100. Upon receiving the sections of program code, controller 300 schedules the section of program code for execution in a compute unit. As described above, in some embodiments, when the section of program code is to be executed in a transaction, controller 300 creates a "redundant transaction pair" by causing compute units 118 and 120 to start separately executing the transaction. Monitoring mechanism 122 then monitors the redundant transaction pair and determines how the transaction is to be handled as described herein.

In addition to controller 300, FIG. 3 includes various first-in-first-out (FIFO) queues that are used for buffering data that is inbound or outbound from a corresponding level of the memory hierarchy (i.e., cache or memory 114). Specifically, FIG. 3 includes L1 input FIFO 306, L1 output FIFO 308, L2 input FIFO 310, and L2 output FIFO 312. Each FIFO queue includes memory circuits used for holding/buffering data as the data is inbound into or outbound from the corresponding level of the memory hierarchy. For example, each of the L1 input FIFOs 306 hold cache blocks from compute units 118 and 120 that are destined for storage in L1 cache 106 or L1 cache 108 and each of the L1 output FIFOs 308 hold cache blocks from L1 caches 106 and 108 destined for storage in L2 caches 110 and 112.

In some embodiments, as a transaction is executed in GPU core 104, transactional writes are held in one or more of the FIFOs and prevented from affecting the architectural state of computing device 100 (i.e., prevented from being propagated to lower levels of the memory hierarchy and thus prevented from being accessed by other entities in computing device 100). For example, in some embodiments, transactional writes can be held in L1 output FIFO 308. In these embodiments, when monitoring mechanism 122 is comparing write-sets, monitoring mechanism 122 may retrieve one or both of identifiers for transactionally-written memory locations (e.g., addresses) and the data transactionally written to the memory locations from one or more of the FIFOs. In these embodiments, monitoring mechanism 122 may not include some or all of write-set 200.

Although various FIFOs are presented in FIG. 3, in some embodiments, other FIFOs are present in computing device 100. For example, in addition to L2 output FIFO 312, computing device 100 may include an input FIFO between L2 caches 110 and 112 and memory 114. Generally, computing device 100 includes sufficient FIFOs to enable the operations herein described.

Note also that, as described above, in some embodiments, mechanisms such as write-set 200 and read-set 202 can be used to keep records of read-sets and write-sets for transactions. These embodiments, may not read values for a read-set or a write-set from the illustrated FIFOs.

Moreover, in some embodiments, controller 300 creates a "redundant transaction pair" by causing a single compute unit (e.g., compute unit 118 or compute unit 120) to execute the first and second transactions (e.g., using threads, etc.). In these embodiments, the transactional writes for both transactions may be held in one of the FIFOs and prevented from affecting the architectural state of computing device 100 (i.e., prevented from being propagated to lower levels of the memory hierarchy and thus prevented from being accessed by other entities in computing device 100). In these embodiments, when monitoring mechanism 122 is comparing write-sets, monitoring mechanism 122 may retrieve one or both of identifiers for transactionally-written memory locations (e.g., addresses) and the data transactionally written to the memory locations from the FIFO. In these embodiments, monitoring mechanism 122 may not include some or all of write-set 200.

Process for Handling Redundant Transaction Pairs

Figure 4:
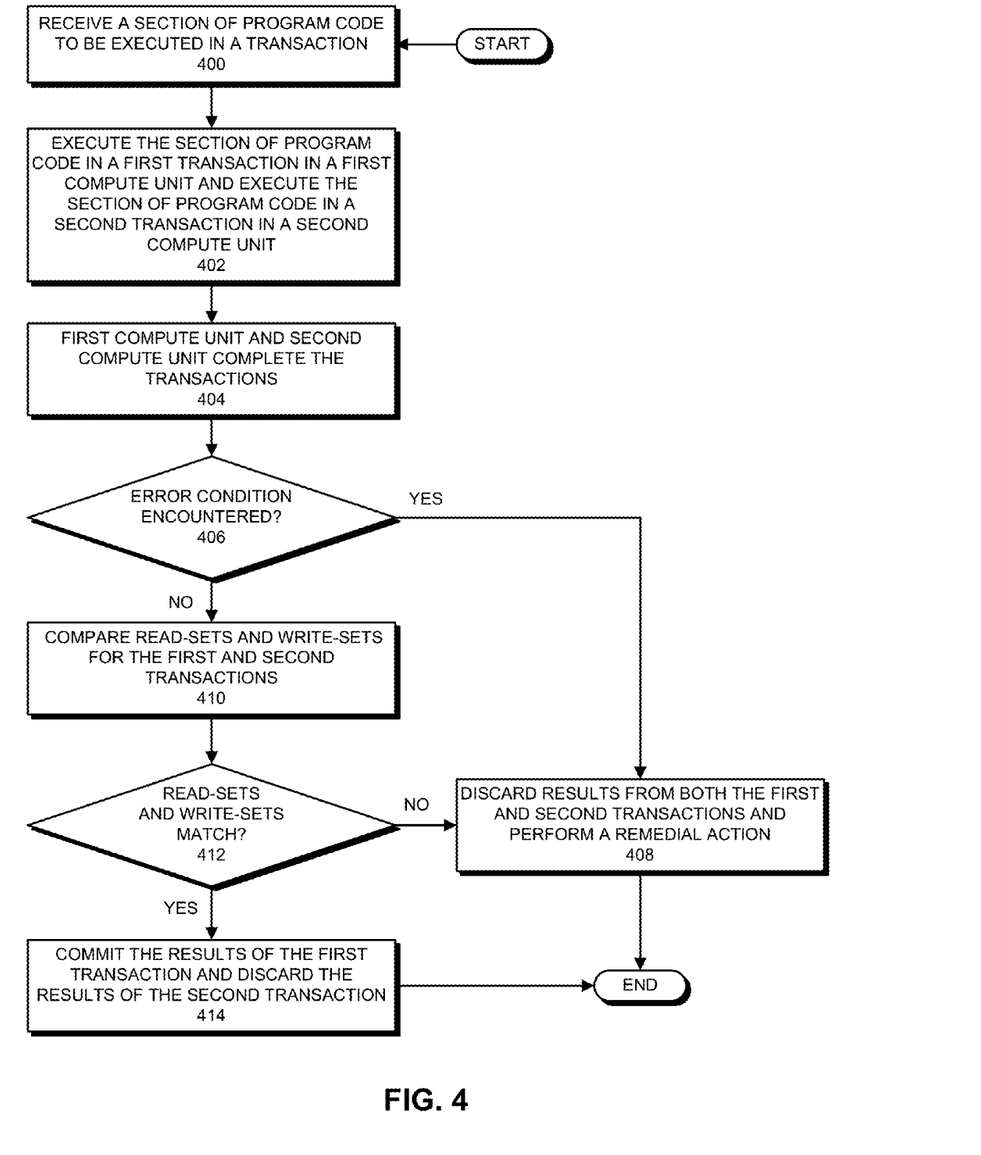
FIG. 4 presents a flowchart illustrating a process for handling a redundant transaction pair in accordance with some embodiments.

FIG. 4 presents a flowchart illustrating a process for handling a redundant transaction pair in accordance with some embodiments. More specifically, in FIG. 4, a process is shown in which GPU core 104 uses compute units 118 and 120 to execute a redundant transaction pair while monitoring mechanism 122 performs operations for monitoring the redundant transaction pair and generally handling each of the transactions.

Note that the operations shown in FIG. 4 are presented as a general example of functions performed by some embodiments. The operations performed by other embodiments include different operations and/or operations that are performed in a different order. Additionally, although certain mechanisms (monitoring mechanism 122, compute units 118 and 120, etc.) are used in describing the process, in some embodiments, other mechanisms can perform the operations. For example, in some embodiments, GPU core 104 uses a single compute unit (e.g., compute unit 118 or 120) to execute both transactions in the redundant transaction pair (e.g., using threads, etc. on the single compute unit). As another example, another type of processor core performs the operations. Generally, any processor core with one or more compute units can perform the operations herein described.

The process shown in FIG. 4 starts when GPU core 104 receives, from another entity in computing device 100 (e.g., CPU core 102) a section of program code that is to be executed in a transaction (step 400). During this operation, GPU core 104 first receives the section of program code (which includes one or more separate instructions) from the other entity. Controller 300 in GPU core 104 then determines that the program code is to be executed in a transaction, e.g., by determining that one or more instructions for commencing a transaction are included with the section of program code, that the section of program code matches a predetermined pattern, etc. Based on this determination, controller 300 determines that the section of program code is to be executed by a redundant transaction pair, which means that two compute units are to execute the corresponding transaction concurrently (substantially in parallel).

Controller 300 then executes the section of program code in a first transaction in compute unit 118 and executes the section of program code in a second transaction in compute unit 120 (step 402). More specifically, controller 300 passes the section of program code to both compute unit 118 and compute unit 120, which then execute the section of program code in two separate transactions. Because compute units 118 and 120 are executing the same section of program code in the transactions, when executing the transactions, both compute units should read the same data from the same locations in memory (i.e., from the same addresses in memory, etc.) and write the same data to the same locations in memory. Thus, a read-set and a write-set for the two transactions should match. However, if there is an error or a fault caused by one or more physical anomalies (e.g., bit-flips caused by environmental variances such as electromagnetic fields, electromagnetic particle impacts, faults in processing circuits in the corresponding compute unit, etc.), the read-set and/or the write-set may not match. The described embodiments use mismatches in read-sets and/or write-sets to detect when one of the compute units 118 and 120 have encountered a fault or error when executing the section of program code in the corresponding transaction.

In some embodiments, as the compute units 118 and 120 execute the corresponding transaction, monitoring mechanism 122 records the read-sets and the write-sets for the first transaction and the second transaction. For example, to record the read-set, monitoring mechanism 122 may record the memory locations (e.g., memory addresses) that were read from during the transaction and the data that was read from each of the memory locations. As another example, to record the write-set, monitoring mechanism 122 may record the memory locations (e.g., memory addresses) that were written to during the transaction and the data that was written to each of the memory locations. Note, that, as described above, one or both of the read-set and the write-set may be automatically recorded as part of the processing of the transaction, and thus may not require separate recording such as read-set 202 and write-set 200.

Next, when both of compute units 118 and 120 complete the corresponding transaction (e.g., begin a commit operation at the end of the transaction or otherwise finish executing the instructions in the section of program code) (step 404), monitoring mechanism 122 determines if an error condition occurred during either of the first and second transactions (step 406). For example, if another entity in the computing device performed an interfering memory access (wrote to a memory location that was read during the transaction, etc.), if a transactional operation performed an illegal operation, and/or if another error condition occurred. If an error condition occurred during either of the first and second transactions (step 406), monitoring mechanism 122 causes compute units 118 and 120 to discard results from the corresponding transaction and perform a remedial action (step 408). Note that, in some embodiments, upon detecting that an error condition has occurred during either transaction (i.e., before the transaction completes), monitoring mechanism 122 immediately causes compute units 118 and 120 to discard results from the corresponding transaction and perform a remedial action as described.

When performing the remedial action, monitoring mechanism 122 generally performs an action to enable one or both of compute unit 118 and 120 to re-execute the section of program code in one or more transactions, handle the transactional error condition, and/or handle the fault/error that is presumed to have occurred. For example, in some embodiments, performing the remedial action comprises restoring a pre-transactional state of compute units 118 and 120 (e.g., using state information for compute units 118 and 120 that was preserved or check-pointed before the first and second transactions were started) and re-executing the section of program code in a third transaction in the first compute unit and a fourth transaction in the second compute unit. In this way, the redundant transaction pair is simply restarted. In some embodiments, after a given number (1, 3, etc.) of transactional failures due to mismatching read-sets or write-sets and/or error conditions, monitoring mechanism 122 may prevent subsequent re-execution of the redundant transaction pair and may instead perform other operations. For example, the other operations may include sending the section of program code back to the entity from which it was originally sent for execution therein, executing the section of program code in a predetermined mode (e.g., a higher/lower-power and/or higher/lower frequency operating mode, etc.), using different compute units to execute the section of program code, etc. As another example, monitoring mechanism 122 may cause one or both of compute units 118 and 120 to perform an error-handling routine (e.g., execute error-handling code, set certain compute unit state, etc.).

If no transactional error condition was encountered (step 406), monitoring mechanism 122 compares the read-sets of the first and second transactions and compares the write-sets of the first and second transactions to determine if the read-sets and the write-sets match (step 410). For example, monitoring mechanism 122 may compare the memory locations and/or the data in the read-set for the first transaction to the memory locations and/or the data in the read-set for the second transaction to determine if the read-sets match. As another example, monitoring mechanism 122 may compare the memory locations and the data written in the write-set for the first transaction to the memory locations and the data written in the write-set for the second transaction to determine if the write-sets match.

In some embodiments, when comparing the read-sets, monitoring mechanism 122 individually compares identifiers for memory locations from which data was read during the first transaction (e.g., some or all of an address for the memory locations, etc.) to identifiers for memory locations from which data was read during the second transaction and compares data that was read from the memory locations during the first transaction to data that was read from the memory locations during the second transaction. Similarly, in some embodiments, when comparing write-sets, monitoring mechanism 122 individually compares identifiers for memory locations where data was written during the first transaction to identifiers for memory locations where data was written during the second transaction and compares data that was written to the memory locations during the first transaction to data that was written to the memory locations during the second transaction. In this way, each piece of data (memory location/data pair) in each read-set and write-set is individually compared to the pieces of data in the other read-set and write-set.

In some embodiments, during each transaction, as data is read from a memory location, monitoring mechanism 122 performs a hashing operation using an identifier of the memory location (e.g., some or all of an address for the memory location) and data that was read from to the memory location to generate a representation (e.g., a numeric value) of the transaction's read-set. In these embodiments, the representation is of a predetermined/fixed size (e.g., one byte, two bytes, etc.) and functions as a cumulative representation. Thus, the hash operation is performed for each read using the prior representation and current information from the read as inputs to arrive at the cumulative representation. A representation of the transaction's write-set may be similarly generated. In these embodiments, when comparing the comparing the read-sets and/or the write-sets, monitoring mechanism 122 compares the representation (of the read-set or the write-set) for the first transaction to the representation for the second transaction. In these embodiments, the comparison operation may be significantly quicker and more efficient due to the small size and singular nature of the representation in contrast to the comparison of the full read-set or write-set, at the expense (in terms of computational effort) of generating the representation during the transaction.

If the read-sets and the write-sets do not match (step 412), monitoring mechanism 122 causes compute units 118 and 120 to discard results from the corresponding transaction and performs a remedial action (step 408). The remedial actions that may be performed are described above. In this way, upon detecting a difference in the read-set and/or the write-set, monitoring mechanism 122 presumes that a fault or error that caused the difference was encountered by the corresponding compute unit and that at least one set of the results is incorrect. Thus, the results are corrupt and therefore discarded.

In contrast, if the read-sets and the write-sets match (step 412), monitoring mechanism 122 permits GPU core 104 to commit the results from the first transaction to an architectural state of the computing device (step 414). For example, GPU core 104 send previously-held transactional writes from the first transaction's write-set to be written to one or more lower-level caches and/or a memory in computing device 100 and may allow transactional state changes to be written to non-transactional locations in computing device 100, thereby making the transactional results accessible to other entities in computing device 100 (i.e., entities outside the GPU core 104). In addition, GPU core 104 can discard or otherwise ignore the results of the second transaction (step 414).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a computing device, comprising:
   in a processor core in the computing device, performing operations for:
      receiving a section of program code to be executed in a transaction;
      in one or more compute units, executing the section of program code in a first transaction and executing the section of program code in a second transaction;
      when the first transaction and the second transaction are completed, comparing data maintained and based on the progress and execution of the first and second transactions, respectively; and
      when data maintained based on the progress and execution of the first transaction matches the data maintained based on the progress and execution of the second transaction, committing results from the first transaction to an architectural state of the computing device and discarding results of the second transaction.

2. The method of claim 1, wherein comparing the data maintained and based on the progress and execution of the first and second transactions comprises comparing a read-set of the first transaction to a read-set of the second transaction and comparing a write-set of the first transaction to a write-set of the second transaction.

3. The method of claim 2, wherein the data maintained based on the progress and execution of the first transaction matches the data maintained based on the progress and execution of the second transaction when the read-set of the first transaction matches the read-set of the second transaction and the write-set of the first transaction matches the write-set of the second transaction.

4. The method of claim 2, wherein comparing the read-set of the first transaction to the read-set of the second transaction comprises:
   comparing one or both of:
      identifiers for memory locations from which data was read during the first transaction to identifiers for memory locations from which data was read during the second transaction; and
      data that was read from the memory locations during the first transaction to data that was read from the memory locations during the second transaction.

5. The method of claim 2, wherein comparing the read-set of the first transaction to the read-set of the second transaction comprises:
   for each of the first transaction and the second transaction:
      during the transaction, as data is read from a memory location, performing a hashing operation using at least one of an identifier of the memory location and data that was read from to the memory location to generate a representation of the transaction's read-set; and
   comparing the representation for the first transaction to the representation for the second transaction.

6. The method of claim 2, wherein comparing the write-set of the first transaction to the write-set of the second transaction comprises:
comparing both:
identifiers for memory locations where data was written during the first transaction to identifiers for memory locations where data was written during the second transaction; and
data that was written to the memory locations during the first transaction to data that was written to the memory locations during the second transaction.

7. The method of claim 2, wherein comparing the write-set of the first transaction to the write-set of the second transaction comprises:
for each of the first transaction and the second transaction:
during the transaction, as data is written to a memory location, performing a hashing operation using at least one of an identifier of the memory location and data that was written to the memory location to generate a representation of the transaction's write-set; and
comparing the representation for the first transaction to the representation for the second transaction.

8. The method of claim 1, further comprising, when the data maintained based on the progress and execution of the first transaction does not match the data maintained based on the progress and execution of the second transaction:
discarding results from the first transaction and the second transaction; and
performing a remedial action.

9. The method of claim 8, wherein performing the remedial action comprises:
in one or more compute units, re-executing the section of program code in a third transaction and a fourth transaction.

10. The method of claim 1, further comprising:
when a transactional error condition is encountered during the first transaction or second transaction,
discarding results from the first transaction and the second transaction; and
performing a remedial action.

11. The method of claim 1, wherein receiving the section of program code comprises:
receiving the section of program code from an entity in the computing device, the entity being a different entity than the processor core.

12. A processor core configured to be installed in a computing device, comprising:
one or more compute units; and
a monitoring mechanism coupled to the one or more compute units;
wherein the processor core is configured to:
receive a section of program code to be executed in a transaction; and
send the section of program code to the one or more compute units to be executed in a first transaction and a second transaction; and
wherein the monitoring mechanism is configured to:
when the first transaction and the second transaction are completed, compare data maintained and based on the progress and execution of the first and second transactions, respectively; and
when data maintained based on the progress and execution of the first transaction matches the data maintained based on the progress and execution of the second transaction, commit results from the first transaction to an architectural state of the computing device and discard results of the second transaction.

13. The processor core of claim 12, wherein comparing the data maintained and based on the progress and execution of the first and second transactions comprises comparing a read-set of the first transaction to a read-set of the second transaction and comparing a write-set of the first transaction to a write-set of the second transaction.

14. The processor core of claim 13, wherein the data maintained based on the progress and execution of the first transaction matches the data maintained based on the progress and execution of the second transaction when the read-set of the first transaction matches the read-set of the second transaction and the write-set of the first transaction matches the write-set of the second transaction.

15. The processor core of claim 13, wherein, when comparing the read-set of the first transaction to the read-set of the second transaction, the monitoring mechanism is configured to compare one or both of:
identifiers for memory locations from which data was read during the first transaction to identifiers for memory locations from which data was read during the second transaction; and
data that was read from the memory locations during the first transaction to data that was read from the memory locations during the second transaction.

16. The processor core of claim 13, wherein, the monitoring mechanism is further configured to:
for each of the first transaction and the second transaction:
during the transaction, as data is read from a memory location, perform a hashing operation using at least one of an identifier of the memory location and data that was read from to the memory location to generate a representation of the transaction's read-set;
wherein, when comparing a read-set of the first transaction to a read-set of the second transaction, the monitoring mechanism is configured to compare the representation for the first transaction to the representation for the second transaction.

17. The processor core of claim 13, wherein, when comparing the write-set of the first transaction to the write-set of the second transaction, the monitoring mechanism is configured to compare both:
identifiers for memory locations where data was written during the first transaction to identifiers for memory locations where data was written during the second transaction; and
data that was written to the memory locations during the first transaction to data that was written to the memory locations during the second transaction.

18. The processor core of claim 13, wherein the monitoring mechanism is further configured to
for each of the first transaction and the second transaction:
during the transaction, as data is written to a memory location, perform a hashing operation using at least one of an identifier of the memory location and data that was written to the memory location to generate a representation of the transaction's write-set;
wherein, when comparing a write-set of the first transaction to a write-set of the second transaction, the monitoring mechanism is configured to compare the representation for the first transaction to the representation for the second transaction.

19. The processor core of claim 12, wherein, when the data maintained based on the progress and execution of the first transaction does not match the data maintained based on the progress and execution of the second transaction, the monitoring mechanism is configured to cause the processor core to:
    discard results from the first transaction and the second transaction; and
    perform a remedial action.

20. The processor core of claim 19, wherein, when performing the remedial action, the processor core is configured to:
    send the section of program code to the one or more compute units to be re-executed in a third transaction and a fourth transaction.

21. The processor core of claim 12, wherein, when a transactional error condition is encountered during the first transaction or the second transaction, the monitoring mechanism is configure to cause the processor core to:
    discard results from the first transaction and the second transaction; and
    perform a remedial action.

22. The processor core of claim 12, wherein, when receiving the section of program code, the processor core is configured to:
    receive the section of program code from an entity in the computing device, the entity being a different entity than the processor core.

23. A computing device, comprising:
    a processor core;
    one or more compute units in the processor core;
    a monitoring mechanism coupled to the one or more compute units in the processor core; and
    an entity coupled to the processor core;
    wherein the processor core is configured to:
        receive a section of program code to be executed in a transaction from the entity; and
        send the section of program code to the one or more compute units to be executed in a first transaction and a second transaction; and
    wherein the monitoring mechanism is configured to:
        when the first transaction and the second transaction are completed, compare data maintained and based on the progress and execution of the first and second transactions, respectively; and
        when data maintained based on the progress and execution of the first transaction matches the data maintained based on the progress and execution of the second transaction, commit results from the first transaction to an architectural state of the computing device and discard results of the second transaction.

24. The computing device of claim 23, wherein comparing the data maintained and based on the progress and execution of the first and second transactions comprises comparing a read-set of the first transaction to a read-set of the second transaction and comparing a write-set of the first transaction to a write-set of the second transaction.

25. The computing device of claim 24, wherein the data maintained based on the progress and execution of the first transaction matches the data maintained based on the progress and execution of the second transaction when the read-set of the first transaction matches the read-set of the second transaction and the write-set of the first transaction matches the write-set of the second transaction.

26. The computing device of claim 24, wherein, when comparing the read-set of the first transaction to the read-set of the second transaction, the monitoring mechanism is configured to compare one or both of:
    identifiers for memory locations from which data was read during the first transaction to identifiers for memory locations from which data was read during the second transaction; and
    data that was read from the memory locations during the first transaction to data that was read from the memory locations during the second transaction.

27. The computing device of claim 24, wherein, the monitoring mechanism is further configured to:
    for each of the first transaction and the second transaction:
        during the transaction, as data is read from a memory location, perform a hashing operation using at least one of an identifier of the memory location and data that was read from to the memory location to generate a representation of the transaction's read-set;
    wherein, when comparing a read-set of the first transaction to a read-set of the second transaction, the monitoring mechanism is configured to compare the representation for the first transaction to the representation for the second transaction.

28. The computing device of claim 24, wherein, when comparing the write-set of the first transaction to the write-set of the second transaction, the monitoring mechanism is configured to compare both:
    identifiers for memory locations where data was written during the first transaction to identifiers for memory locations where data was written during the second transaction; and
    data that was written to the memory locations during the first transaction to data that was written to the memory locations during the second transaction.

29. The computing device of claim 24, wherein the monitoring mechanism is further configured to
    for each of the first transaction and the second transaction:
        during the transaction, as data is written to a memory location, perform a hashing operation using at least one of an identifier of the memory location and data that was written to the memory location to generate a representation of the transaction's write-set;
    wherein, when comparing a write-set of the first transaction to a write-set of the second transaction, the monitoring mechanism is configured to compare the representation for the first transaction to the representation for the second transaction.

30. The computing device of claim 23, wherein, when the data maintained based on the progress and execution of the first transaction does not match the data maintained based on the progress and execution of the second transaction, the monitoring mechanism is configured to cause the processor core to:
    discard results from the first transaction and the second transaction; and
    perform a remedial action.

31. The computing device of claim 30, wherein, when performing the remedial action, the processor core is configured to:
    send the section of program code to the one or more compute units to be re-executed in a third transaction and a fourth transaction.

32. The computing device of claim 23, wherein, when a transactional error condition is encountered during the first transaction or the second transaction, the monitoring mechanism is configure to cause the processor core to:
    discard results from the first transaction and the second transaction; and
    perform a remedial action.

33. The computing device of claim 23, wherein the entity is a different entity than the processor core.

\* \* \* \* \*